United States Patent Office 3,363,031
Patented Jan. 9, 1968

3,363,031
ALPHA-HYDROXY POLYPHOSPHONATE ESTERS AND PROCESS FOR MAKING SAME
Gail H. Birum, Kirkwood, Mo., assignor to Monsanto Company, St. Louis, Mo., a corporation of Delaware
No Drawing. Filed Aug. 4, 1964, Ser. No. 387,506
10 Claims. (Cl. 260—931)

This invention relates to organophosphorus compounds. More particularly this invention provides new reactive polyphosphorus esters and the process for preparing them.

Many phosphorus esters are used as plasticizers and as flame-retarding additives for polymer systems. Some such additives are of low molecular weight and tend to volatilize out of the polymer compositions upon heating the polymer containing them. Other phosphorus esters tend to migrate or ooze out of the polymer when pressure is exerted on the polymer composition. Some phosphorus esters are hydrolytically unstable. As a result the advantage sought in adding phosphorus esters to polymers is sometimes lost.

Briefly, this invention provides polyphosphonate esters having hydroxyl groups bonded to carbon atoms which are in turn bonded to phosphorus, that is, alpha-hydroxy-phosphonate structures. In addition to low volatility and high phosphorus content these compounds have the advantage of reactive hydroxyl groups for chemical bonding of the phosphorus esters to various polymers.

This invention also provides a process for preparing the alpha-hydroxypolyphosphonate esters.

More specifically, one aspect of this invention provides new organophosphorus compounds which are conveniently described as having a formula selected from the group consisting of (A)

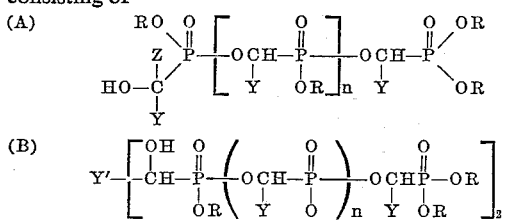

(B)

$$Y'\!-\!\!\left[\begin{matrix}OH & O \\ | & \| \\ -CH-P- \\ | \\ OR\end{matrix}\!\!\left(\!\!\begin{matrix}O \\ \| \\ OCH-P- \\ | & | \\ Y & O\end{matrix}\!\!\right)_{\!\!n}\!\!\begin{matrix}O \\ \| \\ OCHP-OR \\ | & | \\ Y & OR\end{matrix}\right]_{2}$$

wherein each R is selected from the group consisting of alkyl having from 1 to about 12 carbon atoms, and chloroalkyl, and bromoalkyl having from 2 to about 12 carbon atoms, in each of such moieties, each Y is selected from the group consisting of hydrogen, alkyl having from 1 to about 8 carbon atoms, monocyclic aryl having from 6 to about 8 carbon atoms, furyl and thienyl; Z is selected from the group consisting of hydrogen, methyl and ethyl, and is methyl or ethyl only when Y is alkyl having from 1 to 2 carbon atoms; Y and Z taken together with the carbon to which they are attached complete a cycloalkanone ring having from 5 to 6 carbon atoms in the ring; and Y' is selected from the group consisting of alkylene having from 2 to about 10 carbon atoms and phenylene, and $n$ is an average number of from 0 to about 30.

Another aspect of this invention comprises a method for preparing alpha-hydroxy polyphosphonate esters which process comprises combining (a) a carbonyl compound which is either an aldehyde or a ketone with (b) a reactant which is either water, a non-oxidizing mineral acid, or a mixture of water and the non-oxidizing mineral acid and with (c) a polyphosphorus phosphite, said combination being conducted at a temperature of from about $-25$ to about $125°$ C., said carbonyl compound (a) having the formula selected from the group consisting of (1)

and (2)               OHC—Y'—CHO wherein Y is selected from the group consisting of hydrogen, alkyl having from 1 to about 8 carbon atoms, monocyclic aryl having from 6 to about 8 carbon atoms, furyl and thienyl and Z is selected from the group consisting of hydrogen, methyl and ethyl and is methyl or ethyl only when Y is methyl or ethyl; Y and Z taken together with the carbon atom to which they are attached complete a cycloalkanone ring having from 5 to 6 carbon atoms in the ring; and Y' is selected from the group consisting of alkylene having from 2 to about 10 carbon atoms, and phenylene; said reactant (b) being selected from the group consisting of water, a non-oxidizing mineral acid and acids resulting from the mixture of water and a non-oxidizing mineral acid; said polyphosphorus phosphite ester (c) having a formula

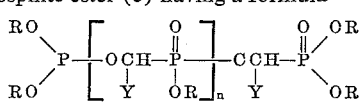

wherein each R is selected from the group consisting of alkyl having from 1 to about 12 carbon atoms, and chloroalkyl and bromoalkyl having from 2 to about 12 carbon atoms in each of such moieties, each Y is selected from the group consisting of hydrogen, alkyl having from 1 to about 8 carbon atoms, monocyclic aryl having from 6 to about 8 carbon atoms, furyl and thienyl and $n$ is an average number of from 0 to about 30, to obtain as product of the resulting reaction an alpha-hydroxy polyphosphonate ester in which both the alpha-hydroxyl group and the pentavalent phosphorus derived from the trivalent phosphorus of the phospite polyphosphonate ester are bonded to the same carbon atom.

In conducting the process of this invention, the order in which the three reactants are combined has a substantial influence on the conversion of the reactants and on the yield of the desired alpha-hydroxy polyphosphonate produce. In the process of this invention I have found that the best results are obtained by combining the aldehyde or ketone reactant (a), admixed with either of reactant (b), that is, either water, a non-oxidizing mineral acid, or the acid mixture of the two, or the phosphite-polyphosphonate ester reactant (c) with the third reactant. It is not desirable to add the aldehyde or ketone reactant (a) to a mixture of reactant (b) and the phosphite-polyphosphonate ester in the absence of the aldehyde or ketone because in the absence of such carbonyl compounds the reactant (b) and the phosphite-polyphosphonate ester (c) enter into an undesired side reaction which minimizes the yield of the desired product. A preferred method for conducting the process is to add reactant (b) to a mixture of the carbonyl compound (a) and the phosphite-polyphosphonate ester reactant (c). However, it is within the scope of the invention to combine the phosphite-polyphosphonate ester reactant (c) with a mixture of the aldehyde or ketone compound (a) and reactant (b). If the latter alternative is used, it is preferred that the aldehyde or ketone and the reactant (b) be combined just prior to combining this resulting mixture with the phosphite-polyphosphonate ester (c) to minimize possible side reactions between reactants (b) and the aldehyde or ketone compound used.

It is also within the scope of the invention to add all three reactants to the reaction vessel simultaneously, providing that there is present an excess of the carbonyl compound reactant. For most efficient operation the process should usually be conducted according to the above mentioned preferred method of adding the reactant (b) to a mixture of the selected aldehyde or ketone compounds (a) and the phosphite-polyphosphonate reactant (c).

I have found that the three reactants when combined as defined above react in substantially stoichiometric proportions. For efficient operation of the process, therefore, it is desirable that each of the reactants (a), (b), (c), be combined in substantially stoichiometric proportions although the aldehyde or ketone reactant (a) may be present in somewhat of an excess from exact stoichiometry with respect to the other two reactants to insure complete reaction.

The process of the invention may be conducted by combining the aldehyde or ketone compound (a), the reactant (b), and the phosphite polyphosphonate ester reactant (c) in a temperature range of about —0° C. to about 125° C. Lower temperatures may be useful when the lower molecular weight reactants, particularly the lower alkanecarboxaldehydes are used as the carbonyl compound reactant (a). But for the higher molecular weight reactants, such low temperatures cause the reaction to proceed more slowly than is desired in most cases. Temperatures much higher than those stated may not be desired for most combinations of reactants because they tend to cause deleterious side reactions. For most combinations of the three reactants, it is preferred to conduct the process at temperatures of from about 0° to about 50° C. or 75° C. until the reaction is substantially completed at which time it may be desirable to raise the temperatures somewhat to insure complete reaction. Because the reaction is to some extent exothermic, especially with the lower molecular weight reactants, gradual combination of the reactants with agitation is recommended, at least in initial runs, in order to obtain smooth reaction. Using the lower alkane carboxaldehydes, which are very reactive, external cooling is usually advantageous. When working with the very reactive aldehydes of this type optimum conditions comprise gradual addition of the reactant (b) to a mixture of the phosphite-polyphosphonate ester and the aldehyde or ketone reactants. However, as will be apparent to those skilled in the art, the exothermic nature of the reaction becomes less of a factor as the molecular weight of the reactants is increased.

Useful carbonyl compounds, that is, (a) in the above described process, are generally the aliphatically saturated hydrocarbon aldehydes having from 1 to about 8 carbon atoms, the cycloaliphatic aldehydes having from 5 to 6 carbon atoms in the ring of such aldehydes, and monocyclic aryl carboaxaldehydes having from 7 to about 8 carbon atoms as well as lower dialkyl ketones. Heterocyclic aldehydes such as 2- or 3-furfuraldehyde and 2- or 3-thiophenecarboxaldehyde may also be used. Lower dialkyl ketones having from 1 to 2 carbon atoms in each alkyl group thereof, and cyclopentanone and cyclohexanone may also be used. Aldehydes appear to participate in the reaction more readily than ketones and are therefore the preferred reactants. Halogen, hydroxyl, alkyl, alkoxyl, and other similar substituents may be present in the above saturated aliphatic, cycloaliphatic, and monocyclic aryl carboxaldehydes without serious effect on the course of the reaction.

Examples of aldehydes that may be used include the alkanecarboxaldehydes, the lower members of which are preferred for reasons of cost and availability, specific examples of which are formaldehyde, acetaldehyde, propionaldehyde, butyraldehyde, isobutyraldehyde, valeraldehyde, isovaleraldehyde, hexanal, heptanal, 2-ethylhexanal, octanal, 2-butyloctanal, 6-methylheptanal, as well as the cycloalkanecarboxaldehydes, such as cyclopentylcarboxaldehyde, and cyclohexylcarboxaldehyde. Useful aromatic aldehyde reactants may be optionally substituted with one or more non-reacting substituent groups of the type described above. Examples of these aldehydes are benzaldehyde, o-, m-, and p-tolualdehyde, 2,4-dimethylbenzaldehyde, vanallin, 2,4-dichlorobenzaldehyde, and 3,4-dibromobenzaldehyde.

Of the lower dialkyl ketones which may be used in the process of this invention, the simplest member, acetone, is preferred, although methyl ethyl ketone and diethyl ketone may also be used. Cyclopentanone and cyclohexanone are of substantially equivalent reactivity with the acetone and may be used interchangeably therewith. Because of the reduced reactivity of the ketone type reactants, I find that one should use a non-oxidizing mineral acid as the reactant (b) when a ketone is used as the carbonyl reactant (a).

Examples of useful dialdehydes include the saturated aliphatic and aromatic dialdehydes and various substituted modifications of these types of aldehydes. They are illustrated by:

Malonaldehyde, succinaldehyde, isosuccinaldehyde, glutaraldehyde, dimethylmalonaldehyde, ethylmalonaldehyde, methylsuccinaldehyde, adipaldehyde, pimelaldehyde, suberaldehyde (octanedialdehyde), isopropylglutaraldehyde, nonanedialdehyde, 3-propyladipaldehyde, sebacaldehyde (decanedialdehyde), hendecanedialdehyde, dodecanedialdehyde, pentanedialdehyde, malealdehyde, fumaraldehyde, citraconaldehyde, itaconaldehyde, mesaconaldehyde, cis- and trans-pentenedialdehyde, etc.

Example of monocyclic aromatic dialdehydes which may be used include:

Phthalaldehyde, isophthaldehyde, terephthaldehyde, 1,-4 - naphthenedicarboxaldehyde, biphenyl-o-o'-dialdehyde, p-[1-(2-formylethyl)]benzaldehyde 2,4-pyrroldialdehyde, p-[1-(5 - formylpentyl)]benzaldehyde, 6-[1-(4-formyl-2-butenyl)]-2-naphthaldehyde, etc.

The polyphosphorus ester reactant (c) contains one trivalent phosphorus atom in a phosphite configuration and at least one pentavalent phosphorus atom having at least one ester group attached thereto. These polyphosphorus ester reactants may be prepared by mixing together a trivalent phosphorus ester, an aldehyde or a ketone, and an organic phosphorus compound having halogen attached to the phosphorus atom thereof in a 1:1:1 molar proportion to obtain as product of the process a trivalent phosphorus ester compound of the formula

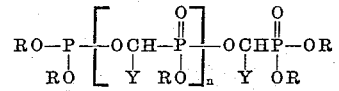

wherein R and Y are as defined above and $n$ has an average value of 0. Compounds of this type may be prepared as described in detail in U.S. Patent 3,014,944, which is incorporated herein by reference thereto in order to avoid undue lengthening of this specification. A few examples of such useful trivalent phophorus ester reactants include:

Bis(2-chloroethyl) 1-[bis(2-chloroethoxy)phosphinyl] ethyl phosphite;
Bis(2-bromopropyl) 1-[bis(2-chloropropoxy)phosphinyl] propyl phosphite;
Butyl alpha-(diethoxyphosphinyl)benzyl phenylphosphonite;
Dihexyl 1-(dihexyloxyphosphinyl)octyl phosphite;
Didodecyl 1-(didodecyloxyphosphinyl)-2-ethylhexyl phosphite;
2-chlorobutyl butyl alpha-[bis(bis-4-chlorohexyloxy) phosphinyl]-4-hydroxy-3-methoxybenzyl phosphite;
10,11-dichlorododecyl ethyl alpha-(dipropoxyphosphinyl) furyl phosphite;
Bis(2-bromo-3-chloropropyl) 2-(dibutoxyphosphinyl) propyl phosphite;

When excess organic phosphorus halide and aldehyde are provided in relation to the trivalent phosphorus ester reactant in the reaction mixture, they react with the above trivalent phosphorus ester (I) according to the scheme:

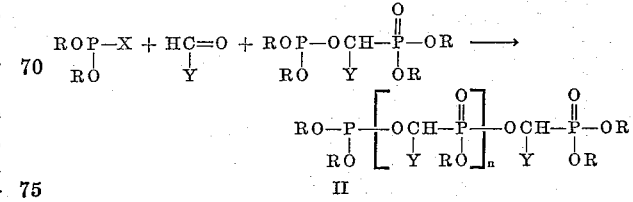

that is, a compound of the above type in which $n$ has an average value of 1. Further reaction of this trivalent phosphorus ester II with more organo phosphorus halide and aldehyde results in the formation of a trivalent phosphorus ester product having higher $n$ values. From the above it is apparent that the presence of the repeating units

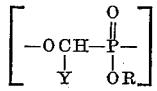

in the product prepared from an RO—P(OR)$_2$ ester, the organic phosphorohalidite, and the aldehyde, depends upon whether the quantity of the trivalent phosphorus ester present in the initial reaction mixture is less on a molar basis than the quantity of the phosphorohalidite and aldehyde. Whenever it is less, the 1:1:1 reaction product

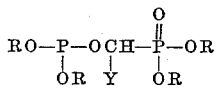

functions as a trivalent phosphorus ester reactant (RO)$_2$POR, and reacts with the excess of halidite and aldehyde present. The product thus formed in turn functions as a trivalent phosphorus ester, so that there is involved in the preparation of such trivalent phosphorus ester reactants (c) a chain reaction to give a mixture of compounds having varying proportions of the repeating unit

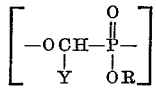

Trivalent phosphorus ester compounds containing groups of the above described type are described in more detail in U.S. Patent 3,014,954 which is incorporated herein by reference to describe the type of trivalent phosphorus polyphosphorus esters which may be used in the process of this invention. The patent is incorporated herein by reference to avoid undue lengthening of this specification. However, a few examples of such compounds are those resulting from the reaction of the organo phosphorus halide, a trivalent phosphorus ester, and an aldehyde in the indicated proportions.

*Example A*

A mixture of tris(2-chloropropyl) phosphite and bis(2-chloropropyl) phosphorochloridite was first prepared from 2 moles of phosphorus trichloride and 4.67 moles of propylene oxide using 0.05 mole of ethylene chlorohydrin as a reaction initiator. The resulting mixture contained the tris(2-chloropropyl) phosphite and bis(2-chloropropyl) phosphorochloridite in a 1:2 molar ratio of phosphite: phosphorochlorodite. This mixture was treated with two moles of acetaldehyde at 15°–30° C. to obtain as product a phosphite-diphosphonate of the formula

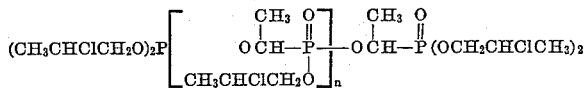

where $n$ has an average value of 1.

*Example B*

A phosphite-polyphosphonate having an average $n$ value of 20 was prepared as follows:

A 2-liter flask equipped with a Dry Ice condenser, stirrer, thermometer, and gas inlet tube extending below the liquid surface was blown with nitrogen to remove air and charged with 550 g. (4 moles) of phosphorus trichloride and 2.8 g. of ethylene chlorohydrin, and then 360 g. (8.18 moles) of ethylene oxide was added under nitrogen in 1.2 hours while cooling in a Dry Ice bath at 15°–20° C. After removing a sample for anlysis, 168 g. (3.82 moles) of acetaldehyde was added from a dropping funnel in 0.5 hour, largely at 45°–50° C. with cooling. The reaction mixture warmed slowly from heat of reaction to 55° C., and it was then warmed with a heating mantle to reflux (91° C.) in a total of 0.9 hour after the acetaldehyde addition. Refluxing was continued at 91–94° C. for 0.5 hour and then the condenser was replaced with a distillation head, and the by-product ethylene dichloride was distilled at reduced pressure to give 700.5 g. of a phosphite-polyphosphonate as a colorless residue which was too viscous to flow at room temperature.

Phosphite-polyphosphonate compounds of the above described type having the terminal trivalent phosphorus atom in the form of a five-membered dioxaphospholane group are also useful in the process of this invention when anhydrous hydrogen chloride or hydrogen bromide is used as reactant (b).

Examples of alpha-hydroxy polyphosphonate esters obtained according to the process of this invention when $n$ has a value of 0, are described below. For example, by reacting formaldehyde, hydrogen chloride, and 1-[bis(2-chloroethoxy)phosphinyl]ethyl bis(2-chloroethyl) phosphite there is obtained 1-[bis(2-chloroethoxy)phosphinyl] ethyl 2-chloroethyl hydroxymethylphosphonate. Similarly, by reacting acetone, hydrogen bromide, and alpha-(dihexyloxyphosphinyl)-3-methylbenzyl diethyl phosphite there is obtained alpha-(dihexyloxyphosphinyl)-3-methylbenzyl ethyl (1-hydroxy-1-methylethyl)phosphonate. By reacting propionaldehyde, water, and 1-(dioctyloxyphosphinyl) pentyl dipropyl phosphite there is obtained 1-(dioctyloxyphosphinyl)pentyl propyl 1-hydroxypropylphosphonate. By reacting cyclohexanone, hydrogen chloride and 1-[bis(2-chlorooctyloxy)phosphinyl]heptyl bis(2 - chloroethyl) phosphite there is obtained 1-[bis(2-chlorooctyloxy)phosphinyl]heptyl 2-chloroethyl 1 - hydroxycyclohexylphosphonate. By reacting cyclopentanecarboxaldehyde, sulfuric acid, and alpha - [(2 - chloroethoxy)(2-bromoethoxy)phosphinyl] - 2,4 - dichlorobenzyl diethyl phosphite there is obtained alpha-[(2-chloroethoxy)(2-bromoethoxy)phosphinyl]-2,4 - dichlorobenzyl ethyl hydroxy(cyclopentyl)methylphosphonate. By reacting methyl ethyl ketone, hydrogen chloride, and 1-(diethylphosphinyl)propyl diethyl phosphite there is obtained 1-(diethylphosphinyl)propyl ethyl (1-hydroxy-1-methylpropyl) phosphonate. By reacting cyclohexanecarboxaldehyde, phosphoric acid, and alpha-(dinonyloxyphosphinyl)furyl bis(2-bromopropyl) phosphite, there is obtained alpha-(dinonyloxyphosphinyl)furyl 2 - bromopropyl hydroxy (cyclohexyl)methylphosphonate.

When a dialdehyde is used in the process of this invention with a polyphosphorus trivalent phosphorus containing ester, there is obtained as product of the process a compound containing two alpha-hydroxyphosphonate groups according to the following equation wherein R, Y, Y′, X and $n$ are as defined above.

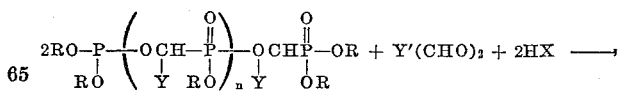

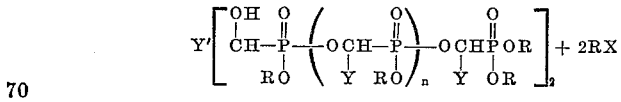

An example of an alpha-hydroxy polyphosphonate ester in which $n$ has a value greater than 0 and the reactants from which it is obtained is the reaction of acetaldehyde, hydrogen chloride, and the polyphosphorus trivalent phosphorus ester of the formula

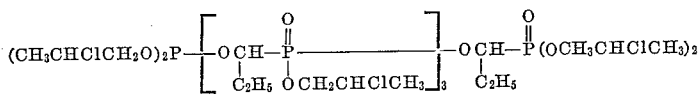

to obtain an alpha-hydroxy polyphosphonate ester of the formula

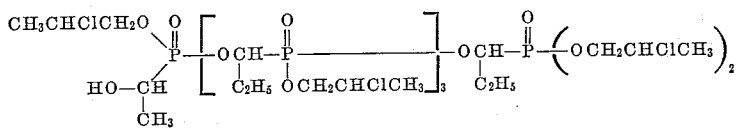

Similarly, reaction of 2,4-dimethylbenzaldehyde, sulfuric acid, and a polyphosphorus trivalent phosphorus ester of the formula

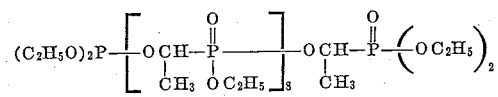

gives as the alpha-hydroxy polyphosphonate ester the compound

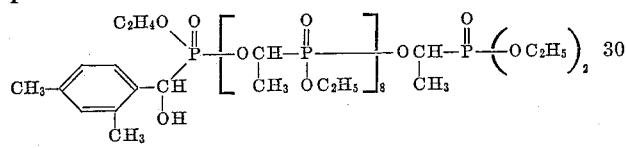

Example 1

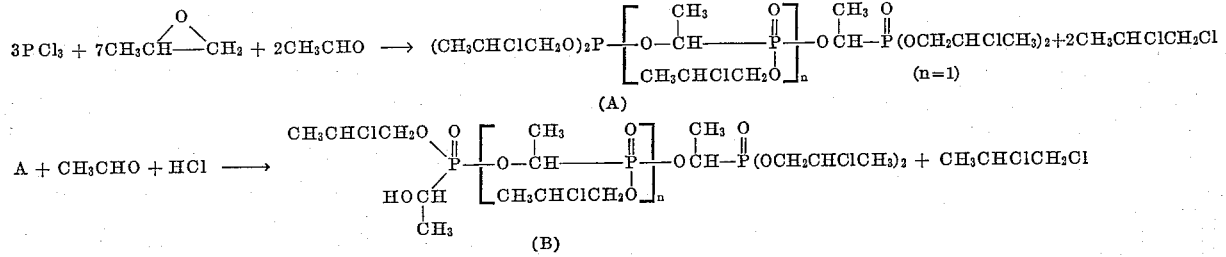

When the carbonyl compound reactant (a) is a dialdehyde such as glutaraldehyde, rectant (b) is a non-oxidizing mineral acid such as hydrogen bromide, and the trivalent phosphorous polyphosphorous reactant (c) is derived, for example, from the interaction of ethylene oxide, and phosphorous trichloride, and furfural in the manner described in Example 19 of U.S. Patent 3,014,954, there is obtained as product a compound of the formula

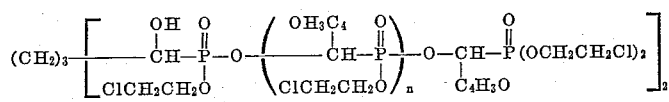

wherein $n$ is 1.

The process of the present invention may be conducted in the absence of an inert diluent. But the use of diluents may be employed and may be particularly advantageous when working with reactants that give viscous liquids or solid products. Such diluents may be for example, benzene, toluene, methylene chloride, ethylene chloride or hexane. The reaction product may be used directly for a variety of industrial and agricultural purposes without purification, that is the products consists essentially of the alpha-hydroxy polyphosphonate ester admixed with the by-product obtained. When hydrogen chloride or hydrogen bromide has been used as the reactant (b) there is obtained as by-product a halogenated hydrocarbon which has some commercial value in itself.

The alpha-hydroxy polyphosphonate esters of this invention are stable compounds which are usually liquid materials but may range in physical appearance from liquids to crystalline solids. They are useful for a variety of industrial purpose applications. They are of particular interest as reactive flame retarding ingredients for polyether and polyester based polyurethane foam. They are also useful as hydrocarbon mineral oil based lubricant additives to which they impart extreme pressure enhancing characteristics. They also have some utility in gasoline fuel compositions for internal combustion engines as pre-ignition inhibiting agents.

The invention is further illustrated by the following examples.

A 3-liter, 4-necked flask equipped with a Dry Ice-cooled condenser, stirrer, thermometer and addition funnel was charged with 825.0 g. (6.0 moles) of phosphorus trichloride and 4 g. of ethylene chlorohydrin catalyst. Propylene oxide 813.0 g. (14.0 moles), was then added under nitrogen in 0.8 hour with cooling at 15–20° C. The addition of 193.5 g. (4.4 moles) of freshly distilled acetaldehyde was then started. The temperature was allowed to rise from heat of reaction to 55°, and it was kept at 53–55° during the remainder of the addition (total addition time 0.3 hour). The reaction mixture was then warmed at 79–80° for 0.5 hour to complete the reaction and give a colorless solution of intermediate (A) in by-product propylene dichloride (the $P^{31}$ n.m.r. spectrum of this solution had peaks at $-141.5$ and $-21.7$ p.p.m. in an area ratio of about 1:2). After the reaction mixture was cooled to room temperature, an additional 70.5 g. (1.6 moles) of acetaldehyde was added and then 62.0 g. (1.7 moles) of anhydrous hydrogen chloride was added below the surface in 0.7 hour with cooling at 25–30°. The reaction mixture was stirred at 30–35° for 0.25 hour and then stripped to a pot temperature of 90° (0.5 mm.) to give 579.5 g. of crude propylene dichloride as distillate and 1339 g. of colorless hydroxypolyphosphonate (B); $n_D^{25}$ 1.4804; molecular weight, 664 (theory, 648); 13.6% phosphorous (theory, 14.3); 22.5% Cl (theory, 21.9), 2.4% hydroxyl (theory, 2.6); $P^{31}$ n.m.r. peaks at −25.6 and −20.2 p.p.m. in an area ratio of 1:2; infrared absorption bands, 3400, 1245 and 110–950 cm.$^{-1}$.

tion of the reaction mixture to 90° (0.1 mm.) gave 1237 g. (theory, 1226 g.) of yellow, viscous product (C), $n_D^{25}$ 1.5141, $P^{31}$ n.m.r. −22 to −23 p.p.m., molecular weight 1068 (theory, 1228 calcd. for $C_{32}H_{56}Cl_8O_{20}P_6$), 2.9% OH (theory, 2.8%). Characteristic infrared bands were found at 3300, 1250, 1100–950 and 810 cm.$^{-1}$.

Example 2

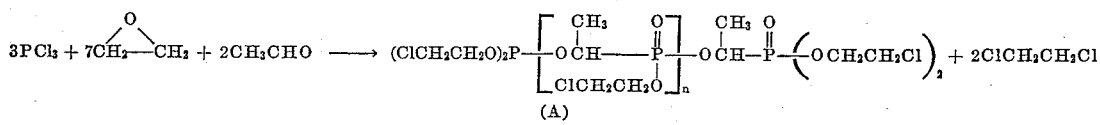

wherein $n$ averages 1.

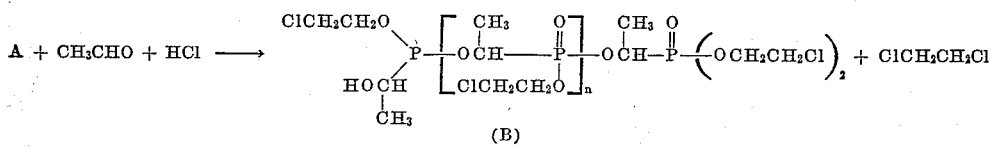

A 3-liter, 4-necked flask equipped with a Dry Ice-cooled condenser, stirrer, thermometer and subsurface gas delivery tube was charged with 825 g. (6.0 moles) of phosphorous trichloride and 4 g. of ethylene chlorohydrin catalyst. Ethylene oxide, 617 g. (14.0 moles), was added under nitrogen in 1.6 hours with cooling at 15–20°. The colorless reaction mixture was warmed to 45°, and 193.5 g. (4.4 moles) of fresly distilled acetaldehyde was added in 0.4 hour with cooling at 45–55°. Heat of reaction raised the temperature to 76° in 0.3 hr. more. The reaction mixture was warmed at 76–87° for 0.5 hr. and then cooled to 20° to give colorless intermediate (A). An additional 70.5 g. of acetaldehyde (making a total of 264 g., 6.0 moles) was added all at once. Anhydrous hydrogen chloride, 65.6 g. (1.8 moles), was then added in 0.6 hr. with cooling at 19–30°, and stirring was continued at 28–30° for an additional 0.5 hr. Water (400 g.) was stirred in and enough sodium carbonate was added to make the mixture neutral to pHydrion paper. After stirring for one hour at room temperature, 45 g. of sodium bisulfite was added and stirring was continued for 0.25 hr. The product layer was separated, washed once with 200 g. of 1% sodium carbonate solution, twice with 200 g. of water and then concentrated to 80° (0.1 mm.) to give 1132 g. (96%) of colorless product (B), $n_D^{25}$ 1.4897; molecular weight, 604 (theory, 592).

Analysis.—Calcd. for $C_{14}H_{29}ClO_{10}P_3$: Cl, 24.0; P, 15.7; OH, 2.9: Found: Cl, 25.0; P, 15.5; OH, 2.9.

$P^{31}$ n.m.r. chemical shifts were found at −27.5 and −21.6 p.p.m. in about a 1:2 area ratio. The −27.5 chemical shift is assigned to the phosphorus atom carrying the alpha-hydroxyethyl group. The following infrared absorption bands were observed:

| Absorption bands, cm.$^{-1}$: | Assignment |
|---|---|
| 3350 | —OH |
| 1240 | P=O |
| 1100–950 | P—O—C |
| 810 | P—O—C |

Example 3

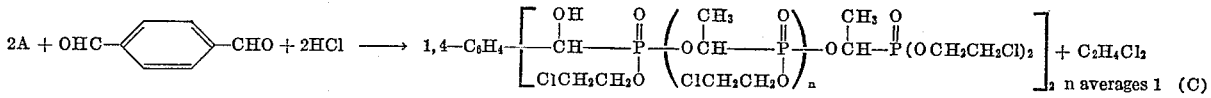

Another portion of phosphite-phosphonate intermediate A prepared as in Example 2 from 6.0 moles of phosphorus trichloride, 14.0 moles of ethylene oxide and 4.0 moles of acetaldehyde was treated with 0.85 mole of terephthalaldehyde and 1.7 moles of hydrogen chloride. Concentra-

I claim:
1. Organic phosphorus compounds having a formula selected from the group consisting of

(A) 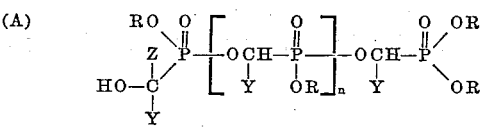

(B) 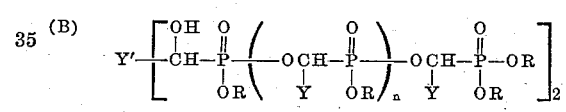

wherein each R is selected from the group consisting of alkyl having from 1 to about 12 carbon atoms, chloroalkyl, and bromoalkyl having from 2 to about 12 carbon atoms, each Y is selected from the group consisting of hydrogen, alkyl having from 1 to about 8 carbon atoms, monocyclic aryl having from 6 to about 8 carbon atoms, furyl and thienyl; Z is selected from the group consisting of hydrogen and alkyl of from 1 to 2 carbon atoms, and is alkyl of from 1 to 2 carbon atoms only when Y is alkyl having from 1 to 2 carbon atoms; Y and Z taken together with the carbon to which they are attached complete a cycloalkanone ring having from 5 to 6 carbon atoms in the ring; and Y′ is selected from the group consisting of alkylene having from 2 to about 10 carbon atoms and phenylene, and $n$ is an average number of from 0 to about 30.

2. Organic phosphorus compounds as in claim 1 wherein the organic phosphorus compound has the Formula A in which compound each R is chloroalkyl having from 2 to about 12 carbon atoms, Y is alkyl having from 1 to about 8 carbon atoms, and $n$ is an average value of about 0.8 to about 1.2.

3. Organic phosphorus compounds as in claim 2 wherein each R is 2-chloropropyl, each Y is methyl, and $n$ is an average number of about 1.

4. Organic phosphorus compounds of the formula in claim 1 wherein the compound has the formula B in which each R is chloroalkyl having from 2 to about 12 carbon atoms, each Y is alkyl having from 1 to about 8 carbon atoms, Y' is phenylene, and each $n$ is an average number of from about 0.8 to 1.2.

5. An organic compound as in claim 4 wherein each R is 2-chloroethyl, each Y is methyl, Y' is phenylene, and each $n$ is an average number of about 1.

6. A process which comprises combining a carbonyl compound (a) with a reactant of the group consisting of (b) a member of the group consisting of water, a non-oxidizing mineral acid and mixtures thereof, and (c) a polyphosphorus ester containing one trivalent phosphorus ester group said combination of carbonyl compound (a) reactant (b) and trivalent phosphorus containing polyphosphorus ester (c) being conducted at a temperature of about −25 to about 125° C., said carbonyl compound reactant (a) being selected from the group consisting of alkanecarboxaldehydes having from 1 to about 8 carbon atoms, cycloalkanecarboxaldehydes having from 5 to 6 carbon atoms in the ring, monocyclic arylcarboxaldehydes having from 6 to about 8 carbon atoms, furfuraldehyde, thiophenecarboxaldehyde dialkyl ketones having from 1 to 2 carbon atoms in each alkyl group, cycloalkanones having from 5 to 6 carbon atoms in the ring of said cycloalkanone, and alkylenedicarboxaldehydes having from 2 to about 10 carbon atoms in the alkylene, and phenylene dicarboxaldehydes, the said reactant (b) being a member of the group consisting of water, a nonoxidizing mineral acid and acid resulting from the mixture of water and the non-oxidizing mineral acid, and the trivalent phosphorus containing polyphosphorus ester reactant (c) having a formula

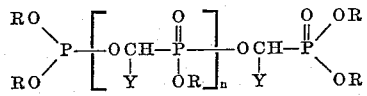

wherein each R is selected from the group consisting of alkyl having from 1 to about 12 carbon atoms, and chloroalkyl, and bromoalkyl having from 2 to about 12 carbon atoms in each of such moieties each Y is selected from the group consisting of hydrogen, alkyl having from 1 to about 8 carbon atoms, monocyclic aryl having from 6 to about 8 carbon atoms, furyl and thienyl and $n$ is an average number of from 0 to about 30, provided that when the carbonyl compound (a) is ketone the reactant (b) is non-oxidizing mineral acid, to obtain as product of the resulting reaction an alpha-hydroxy polyphosphonate ester in which the pentavalent phosphorus derived from the trivalent phosphorus ester moiety of the reactant (c) above and the alpha-hydroxy group are bonded to the same carbon atoms.

7. A process as in claim 6 wherein the carbonyl compound reactant (a) is an alkanecarboxaldehyde having from 1 to about 8 carbon atoms, the reactant (b) is a non-oxidizing mineral acid, the trivalent phosphorus containing polyphosphorus ester reactant (c) is a phosphite-polyphosphonate wherein each R is chloroalkyl having from 2 to about 12 carbon atoms, each Y is alkyl having from 1 to about 8 carbon atoms, and $n$ is an average number of from about 0.8 to about 1.2.

8. A process as in claim 6 wherein the alkanecarboxaldehyde reactant (a) is acetaldehyde, the non-oxidizing mineral acid (b) is hydrogen chloride, and in the trivalent phosphorus containing polyphosphorus ester reactant (c) the chloroalkyl group (R) is 2-chloroethyl, and each alkyl group (Y) is methyl, and $n$ averages about 1.

9. The process as in claim 6 wherein the carbonyl compound reactant (a) is a dialdehyde wherein Y' is phenylene, reactant (b) is a non-oxidizing mineral acid, and in the trivalent phosphorus containing polyphosphorus ester reactant (c) each R is chloroalkyl having from 2 to about 12 carbon atoms, each Y is alkyl having from 1 to about 8 carbon atoms and each $n$ is an average number from about 0.8 to 1.2.

10. A process as in claim 9 wherein the chloroalkyl is 2-chloroethyl, each alkyl is methyl and $n$ averages about 1.

References Cited

UNITED STATES PATENTS 3,189,635 6/1965 Tiemar _____ 260—969 X
3,207,776 9/1965 Gilbert et al. _____ 260—969 X CHARLES B. PARKER, *Primary Examiner.*

A. H. SUTTO, *Assistant Examiner.*